(12) United States Patent
Rauner et al.

(10) Patent No.: US 8,079,349 B2
(45) Date of Patent: Dec. 20, 2011

(54) DRIVE TRAIN FOR A MOTOR VEHICLE

(75) Inventors: Thomas Rauner, Blaubeuren (DE); Sammy Weis, Kirchberg (DE); Karl Dums, Renningen (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 381 days.

(21) Appl. No.: 12/476,647

(22) Filed: Jun. 2, 2009

(65) Prior Publication Data

US 2010/0025129 A1 Feb. 4, 2010

(30) Foreign Application Priority Data

Aug. 4, 2008 (DE) .................. 10 2008 036 284

(51) Int. Cl.
*F02B 33/00* (2006.01)
(52) U.S. Cl. .......................... 123/564; 60/295
(58) Field of Classification Search .................. 123/564, 123/559.3; 60/295, 280
See application file for complete search history.

(56) References Cited

U.S. PATENT DOCUMENTS

| | | | | |
|---|---|---|---|---|
| 5,458,855 | A * | 10/1995 | Gillbrand | 422/168 |
| 5,803,027 | A * | 9/1998 | Bell et al. | 123/65 BA |
| 5,937,831 | A * | 8/1999 | Volkmann et al. | 123/559.3 |
| 5,974,792 | A * | 11/1999 | Isobe | 60/278 |
| 6,227,180 | B1 * | 5/2001 | Hoffmann et al. | 123/564 |
| 6,273,076 | B1 * | 8/2001 | Beck et al. | 123/679 |
| 6,327,856 | B1 * | 12/2001 | Iwabuchi et al. | 60/603 |
| 6,917,873 | B2 * | 7/2005 | Itoyama | 701/108 |
| 7,779,791 | B2 * | 8/2010 | Holzbaur et al. | 123/41.31 |
| 2003/0167756 | A1 * | 9/2003 | Szymkowicz | 60/289 |
| 2005/0153828 | A1 | 7/2005 | Uekusa et al. | |

FOREIGN PATENT DOCUMENTS

| | | |
|---|---|---|
| DE | 4139291 | 6/1993 |
| DE | 198 41 330 | 3/2000 |
| DE | 102007057603 | 6/2009 |
| EP | 1491735 | 12/2004 |

\* cited by examiner

*Primary Examiner* — Thanh Lam
(74) *Attorney, Agent, or Firm* — Gerald E. Hespos; Michael J. Porco

(57) ABSTRACT

A motor vehicle has an internal combustion engine (1) and a drive train (2) with an electric machine that can be operated as a generator. A supercharger (5) supplies air through a mass flow line (6) to an inlet side of the internal combustion engine (1). The air mass flow line (6) has no throttle valve. The supercharger (5) also selectively can function as a secondary air pump to blow secondary air through a branch (7) of the mass flow line (6) and to an outlet side (21a, 21b) of the internal combustion engine (1) upstream of a catalytic converter. A control unit causes the electric machine to operate as a generator when the supercharger (5) is functioning as a secondary air pump to compensate for excess torque caused by a charge pressure generated by the secondary air.

13 Claims, 1 Drawing Sheet

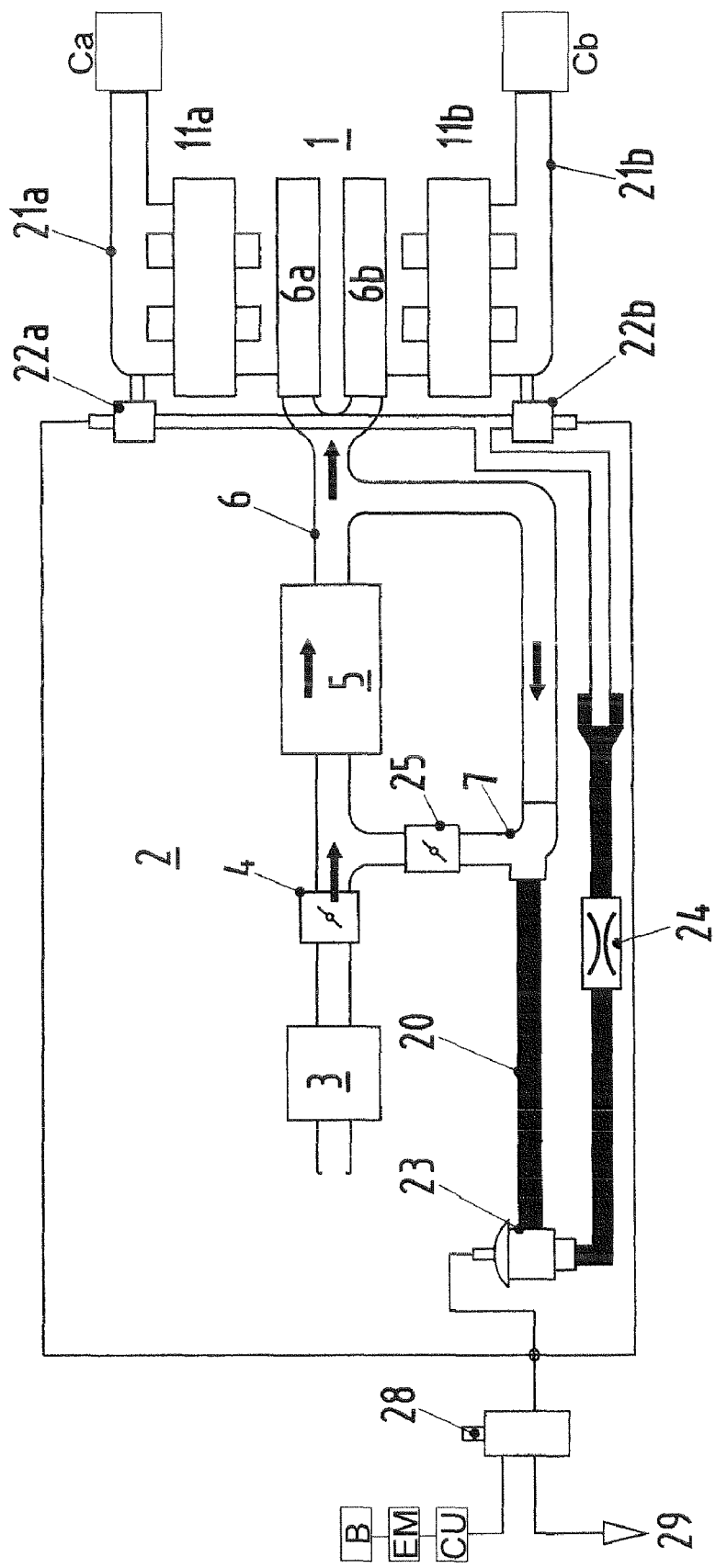

DRIVE TRAIN FOR A MOTOR VEHICLE

This application claims priority under 35 USC 119 to German Patent Application No. 10 2008 036 284.0 filed on Aug. 4, 2008, the entire disclosure of which is incorporated herein by reference.

BACKGROUND OF THE INVENTION

1. Field of the Invention

The intention relates to a drive train for a motor vehicle.

2. Description of the Related Art

DE 19841 330 discloses a supercharger to raise a charge pressure at the inlet side of the air system of an internal combustion engine to increase the power of the internal combustion engine. A secondary air pump also is used in the air system disclosed in DE 198 41 330 at a position upstream of a catalytic converter to blow secondary air into the outlet side of the internal combustion engine. As a result, the oxygen content in the exhaust gas is increased and the catalytic converter is heated up more quickly through post-combustion. A supercharger could be used instead of the secondary air pump. However, further valves and a relatively complex regulating system then would be required in the air system of the internal combustion engine to prevent an undesired additional charge pressure and a resulting excess torque of the internal combustion engine when the supercharger is used as the secondary air pump.

An object of the invention is to eliminate the secondary air pump from a drive train for an internal combustion engine that is supercharged by a supercharger, while modifying the air system as little as possible.

SUMMARY OF THE INVENTION

The invention relates to a drive train for a motor vehicle with an internal combustion engine that is supercharged by a supercharger for supplying a predefinable torque to the drive train. The internal combustion engine has an inlet side, and the supercharger is connected to the inlet side of the internal combustion engine via an air mass flow line without a throttle valve. The drive train has at least one electric machine that can be operated as a generator. Secondary air is blown into the outlet side of the internal combustion engine upstream of a catalytic converter to yield desirable effects on the exhaust gas as described in the prior art. However, the secondary air blown into the outlet side of the internal combustion engine upstream of the catalytic converter also affects the charge pressure and results in excess torque of the internal combustion engine. To compensate for the excess torque of the internal combustion engine, the drive train of the subject invention also has a control unit that is configured to cause the electric machine to operate in a generator mode while the supercharger is operating as a secondary air pump. The invention is based on the realization that the air system of the internal combustion engine need not have additional throttle valves with correspondingly complex regulating systems to be employed when the supercharger is used as a secondary air pump, provided that the drive train of the motor vehicle also has an electric machine that can be operated as a generator. Instead, the excess torque generated by the operation of the supercharger as a secondary air pump is "tolerated", i.e. the internal combustion engine is operated with higher torque than the torque actually predefined by the driver of the motor vehicle, for example by means of the accelerator pedal. However, the driver of the motor vehicle does not notice this higher torque because at the same time at least one electric machine is operated as a generator with a load that is just enough to precisely compensate the excess torque. Thus, the drive train supplies only the torque that is predefined by the driver of the motor vehicle even though the internal combustion engine is operated with a torque that is higher than the torque predefined by the driver of the motor vehicle. The excess torque is converted into electrical energy by the electric machine that is operated as a generator.

The invention requires only very slight modifications to the air system of the internal combustion engine. More particularly, the air system of the internal combustion engine has an outlet or branch downstream of the supercharger and connected to the secondary air system. In addition, the software in a corresponding control unit is changed to cause the drive train to function as described herein. As a result, the secondary air pump can be dispensed with and corresponding costs saved. In particular, there is no need for further measures in the inlet side air system of the internal combustion engine, such as additional throttle valves or the like. As a result, it is possible, for example when starting the motor vehicle in the morning, that is to say when the catalytic converter is cold and secondary air therefore has to be blown in, to provide an electrical starting process that discharges a battery so that supercharging can be carried out through the operation of the electric machine as a generator.

The drive train preferably is provided in a hybrid vehicle, since a correspondingly dimensioned electric machine usually is already present in a hybrid vehicle, for example as a crank shaft starter-generator, and a correspondingly high-power battery for storing the quantity of electrical energy that is produced when such an electric machine is operated as a generator.

The supercharger may be a compressor. The compressor may be driven either by a belt drive of the internal combustion engine or by an electric motor. Both of these drive means are proven ways of supercharging an internal combustion engine.

Alternatively, the supercharger may be an exhaust gas turbocharger. A particularly high energy utilization rate is obtained with a turbocharger because the exhaust gas energy of the internal combustion engine rotates a turbine and therefore drives the supercharger.

The secondary air line preferably is embodied at least in certain sections as a hose connection. The invention does not require any additional throttle valves in the secondary air line. Therefore, the embodiment of the secondary air line at least partly as a hose connection can be implemented in a simple way and can be adapted well to an existing installation space.

The secondary air line may have a valve. The valve permits the secondary air line to be opened easily if secondary air is to be blown into the outlet side of the internal combustion engine. In addition the valve permits reactions of the outlet side of the internal combustion engine on the air system to be prevented reliably (protection against blow back).

The valve and/or any secondary air valves that may be present can be activated pneumatically by means of an electrically actuated control valve. Such pneumatically actuated valves are used frequently and can be actuated by a control unit by means of the individual, electrically actuated control valve.

Alternatively, the valve and/or the secondary air valves may be electrically actuated valves. Corresponding electric lines are then necessary for connection to a control unit. With this embodiment, pneumatic lines and, if appropriate, even an assigned low pressure reservoir can be dispensed with, in contrast to pneumatically actuated valves.

The drive train preferably is provided in a hybrid vehicle that is a single-shaft parallel hybrid. In this context, the internal combustion engine and an individual electric machine that can be operated either as a generator or as a motor are arranged on a common shaft for driving the hybrid vehicle. A corresponding coupling is provided between the internal combustion engine and the electric machine. Thus, a predefinable torque can then be fed into the drive train by the electric machine and/or by the internal combustion engine to drive at least one wheel of the hybrid vehicle.

The supercharger preferably is used as a secondary air pump when the temperature of the catalytic converter is below a limiting temperature. As a result secondary air is blown into the air system upstream of the catalytic converter so that the catalytic converter is heated up quickly to its optimum operating temperature. The quantity of electrical energy that is produced while the electric machine is operated as a generator also can be stored. More particularly, it is also possible that the invention will be used only if the state of charge (SOC) of a battery, for example of a high voltage battery, is below a threshold value and the battery therefore has to be charged; otherwise, the quantity of electrical energy that is produced would have to be discharged in some other way. For example, the invention may be used for a starting process of the hybrid vehicle after a relatively long stationary time.

The invention will now be explained in more detail with reference to a drawing.

BRIEF DESCRIPTION OF THE DRAWING

The single FIGURE is a schematic representation of an air system of an internal combustion engine of a motor vehicle in accordance with a preferred embodiment of the invention.

DETAILED DESCRIPTION OF THE PREFERRED EMBODIMENT

The FIGURE shows an internal combustion engine 1 of a motor vehicle with an air system 2. Raw air is introduced into the air system 2 via an air filter 3. A throttle valve 4 is provided downstream of the air filter 3 and a supercharger 5 is provided downstream of the throttle valve 4. The supercharger 5 increases the charge pressure of the air that flows out of the throttle valve 4. A mass flow line 6 is downstream of the supercharger 5 and has two connected charge air coolers 6a, 6b, for supplying two banks 11a, 11b of cylinders of the internal combustion engine 1. The compressor or supercharger 5 therefore supplies the inlet side of the internal combustion engine 1 with air, while the air mass flow line 6 is embodied without a throttle valve between the supercharger 5 and the inlet side of the internal combustion engine 1. The internal combustion engine 1 may drive the supercharger 5 via a chain drive or belt drive. In this situation, a supercharger control valve 25 also is arranged in the air mass flow to regulate the quantity of air through the supercharger 5 precisely. The supercharger control valve 25 can be dispensed with in an electrically driven supercharger 5.

A branch 7 is provided in the air mass flow line 6 downstream of the supercharger 5 for selectively connecting the air system to the outlet sides 21a, 21b of the internal combustion engine 1. For this purpose, a secondary air line 20 connects the branch 7 to two secondary air valves 22a, 22b. At least certain sections of the secondary air line 20 may be defined by at least one flexible hose that can be routed appropriately. The secondary air valves 22a, 22b are operative to control the quantity of fresh air on the respective outlet sides 21a, 21b of the internal combustion engine 1 at positions upstream of respective catalytic converters Ca and Cb. A valve 23, for example a diverter valve, is provided for opening and closing the secondary air line 20 as required. Thus, the valve 23 enables blowing secondary air into the exhaust gas sides 21a, 21b of the internal combustion engine 1 upstream of the catalytic converters Ca, Cb. Furthermore, a throttle 24 is provided for influencing the air mass flow in the secondary air line 20. A constant pressure can be predefined by the throttle 24, for example when the secondary air line 20 has a large cross section.

This particularly preferred embodiment of the invention enables a single modification when eliminating the secondary air pump from the conventional air system of an internal combustion engine 1 that has a supercharger 5 driven by the internal combustion engine 1 via a chain drive or belt drive. More particularly, the invention involves providing the branch 7 and the secondary air line 20 with the valve 23 and the throttle 24. The secondary air line 20, which preferably is a hose, can be routed flexibly from the air system to the exhaust gas side of the internal combustion engine 1 as a function of a predefined installation space. The secondary air line 20 can also partly be embodied as a pipe. In all cases, a secondary air pump supplied with air via an outlet between the air filter 3 and the throttle valve 4 is no longer required and can be dispensed with.

The secondary air valves 22a, 22b and the valve 23 are pneumatic valves in this embodiment and are supplied with pressure by means of a low pressure reservoir 29. An electrical control valve 28, which is in electrical contact with a corresponding control unit CU, is used for actuation. Alternatively, the control valve 28 and the low pressure reservoir 29 can be dispensed with if the valve 23 and the secondary air valves 22a, 22b are electrical valves.

Secondary air can be blown into the outlet side of the internal combustion engine 1 upstream of a catalytic converters Ca, Cb when the temperature of the catalytic converters Ca, Cb is below a limiting temperature, for example after the vehicle is started following a period of not operating. The secondary air blown into the air system upstream of the catalytic converter Ca, Cb generates post combustion so that the catalytic converters Ca, Cb are heated up quickly to their optimum operating temperatures. The secondary air blown into the outlet side of the internal combustion engine 1 upstream of the catalytic converters Ca, Cb also affects the charge pressure and results in excess torque being produced by the internal combustion engine 1. However, the drive train 2 is associated with an electric machine EM that can be operated as a generator. The control unit CU receives a signal, e.g. from the electrical control valve 28, when the supercharger 5 is blowing air into the outlet side of the internal combustion engine 1 upstream of the catalytic converters Ca, Cb in the manner of a secondary air pump. The control unit CU then sends a signal that causes the electric machine EM to operate in a generator mode. Thus, for example, the electric machine EM may recharge the battery B of the hybrid vehicle. The excess torque generated by the operation of the supercharger 5 as a secondary air pump is converted into electrical energy by the electric machine EM that is operated as a generator. Accordingly, the internal combustion engine is operated with higher torque than the torque expected by the driver of the motor vehicle based on the position of the accelerator pedal. However, the driver of the motor vehicle does not notice this higher torque because the electric machine EM simultaneously is being operated as a generator with a load that precisely compensates for the excess torque. Thus, the drive train 2 supplies only the torque that is predefined by the driver of the motor vehicle even though the internal combustion engine 1 is operated with a torque that is higher than the torque predefined by the driver of the motor vehicle. Hence, the exhaust gas can be made cleaner following and engine start-up without a change in torque being noticed by the driver

What is claimed is:

1. A drive train for a motor vehicle having an internal combustion engine that is supercharged by a supercharger, the combustion engine being operative for supplying a predefinable torque to the drive train, the internal combustion engine having an inlet side connected to the supercharger via an air mass flow line, the air mass flow line having a branch for selectively blowing secondary air from the supercharger into a secondary air line and to an outlet side of the internal combustion engine upstream of a catalytic converter, the air mass flow line being provided without a throttle valve, the drive train comprising: at least one electric machine that can be operated as a generator; and a control unit for sensing when the supercharger is blowing secondary air to the outlet side of the internal combustion engine and generating a signal to cause the electric machine to be operated as a generator to compensate for excess torque of the internal combustion engine resulting from a charge pressure generated by blowing the secondary air to the outlet side of the internal combustion engine.

2. The drive train wherein claim 1, wherein the supercharger is a compressor.

3. The drive train of claim 1, wherein the supercharger is an exhaust gas turbocharger.

4. The drive train of claim 1, wherein the secondary air line comprises a hose.

5. The drive train of claim 1, wherein the secondary air line has at least one valve.

6. The drive train of claim 5, wherein the at least one valve is pneumatically actuable and wherein the drive train further comprises an electrically actuable control valve for activating the at least one valve.

7. The drive train of claim 5, wherein the at least one valve is electrically actuable.

8. The drive train of claim 1, wherein the drive train is a single-shaft parallel hybrid drive train, and wherein the internal combustion engine and the electric machine are arranged on a single common shaft.

9. A motor vehicle, comprising:
an internal combustion engine having an air inlet and an exhaust gas outlet;
a catalytic converter communicating with the exhaust gas outlet of the internal combustion engine;
a supercharger for blowing air from an air intake;
an air mass flow line extending from the supercharger to the air inlet of the internal combustion engine, the air mass flow line being free of any throttle valve;
a branch communicating with the air mass flow line and the exhaust gas outlet upstream of the catalytic converter;
at least one valve for selectively permitting the supercharger to blow air through the branch and to the exhaust gas outlet;
an electric machine that can be operated as a generator; and
a control unit for sensing when the supercharger is blowing air to the exhaust gas outlet of the internal combustion engine and generating a signal to cause the electric machine to operate as a generator.

10. The motor vehicle of claim 9, wherein the at least one valve is pneumatically actuable and wherein the motor vehicle further comprises an electrically actuable control valve for activating the at least one valve.

11. The motor vehicle of claim 9, wherein the at least one valve is electrically actuable.

12. A method for operating a hybrid vehicle having: an internal combustion engine with an air inlet and an air outlet; a supercharger communicating with the air inlet and selectively communicating with the air outlet; and at least one electric machine that can be operated as a generator, the method comprising:
sensing whether the supercharger is blowing air into the air outlet;
controlling the electric machine to operate as a generator when the supercharger is blowing air into the air outlet; and
using torque of the internal combustion engine in excess of a predefinable torque level to operate the electric machine as a generator when the supercharger is blowing air into the air outlet.

13. The method of claim 12, further comprising sensing a temperature of a catalytic converter that communicates with the air outlet, and causing the supercharger to blow air into the air outlet upstream of the catalytic converter when the temperature of the catalytic converter is lower than a limiting temperature.

* * * * *